E. L. BUXBAUM.
SYSTEM FOR REGISTERING CALLS AND LOCKING TELEPHONES.
APPLICATION FILED DEC. 2, 1909.
989,762.
Patented Apr. 18, 1911.
4 SHEETS—SHEET 1.
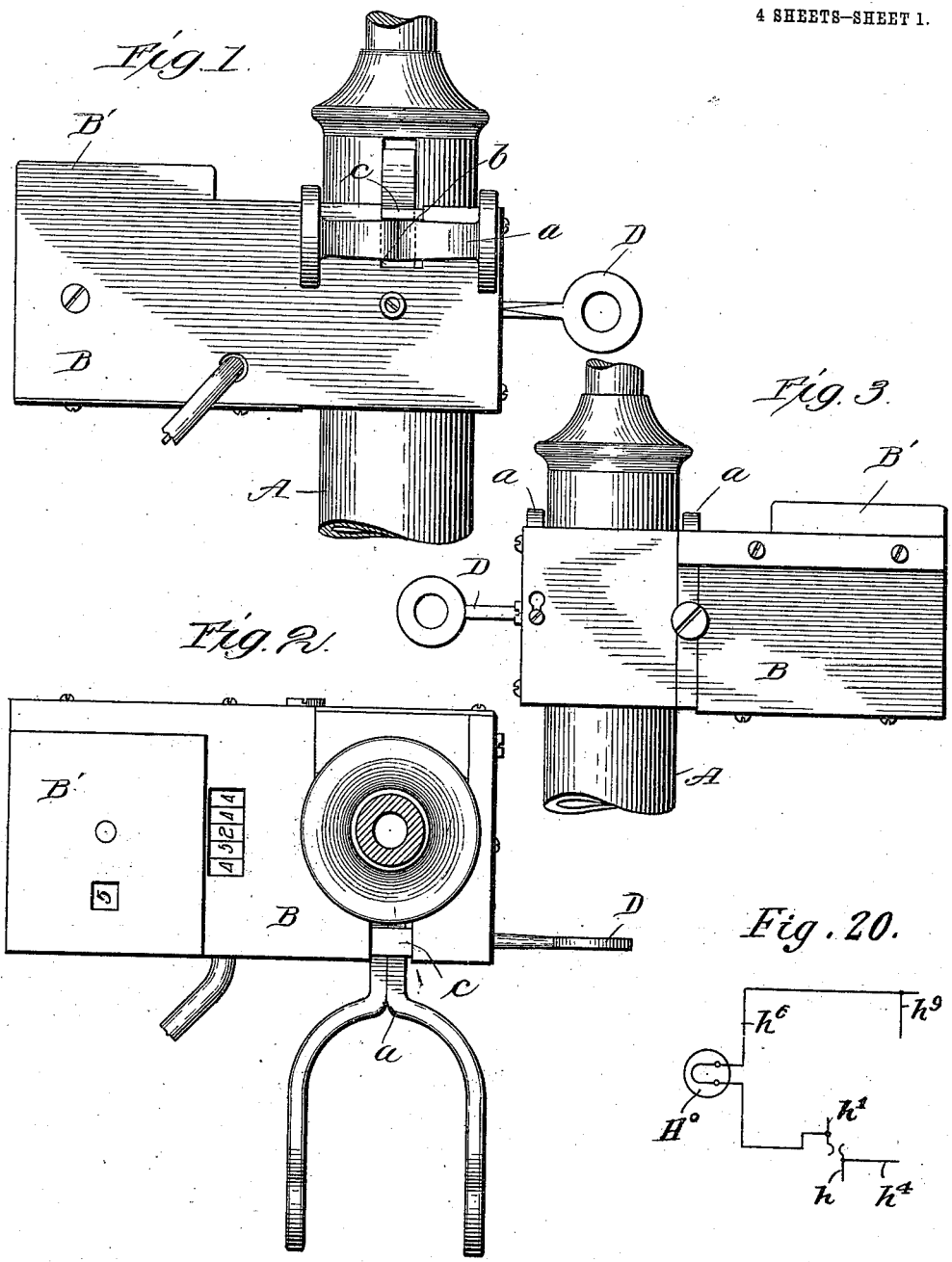

E. L. BUXBAUM.
SYSTEM FOR REGISTERING CALLS AND LOCKING TELEPHONES.
APPLICATION FILED DEC. 2, 1909.
989,762.
Patented Apr. 18, 1911.
4 SHEETS—SHEET 2.
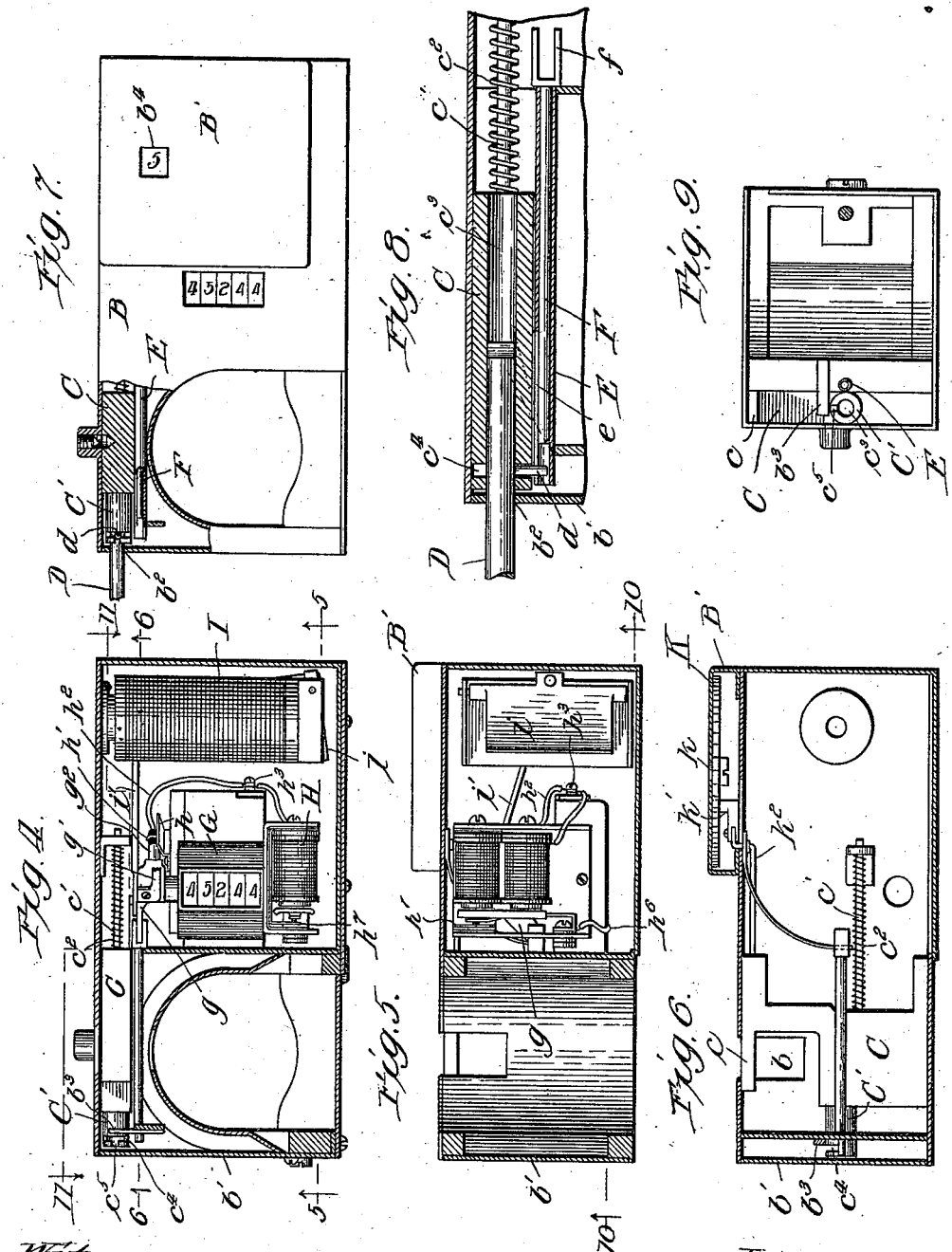

E. L. BUXBAUM.
SYSTEM FOR REGISTERING CALLS AND LOCKING TELEPHONES.
APPLICATION FILED DEC. 2, 1909.

989,762.

Patented Apr. 18, 1911.

4 SHEETS—SHEET 3.

E. L. BUXBAUM.
SYSTEM FOR REGISTERING CALLS AND LOCKING TELEPHONES.
APPLICATION FILED DEC. 2, 1909.
989,762.
Patented Apr. 18, 1911.
4 SHEETS—SHEET 4.
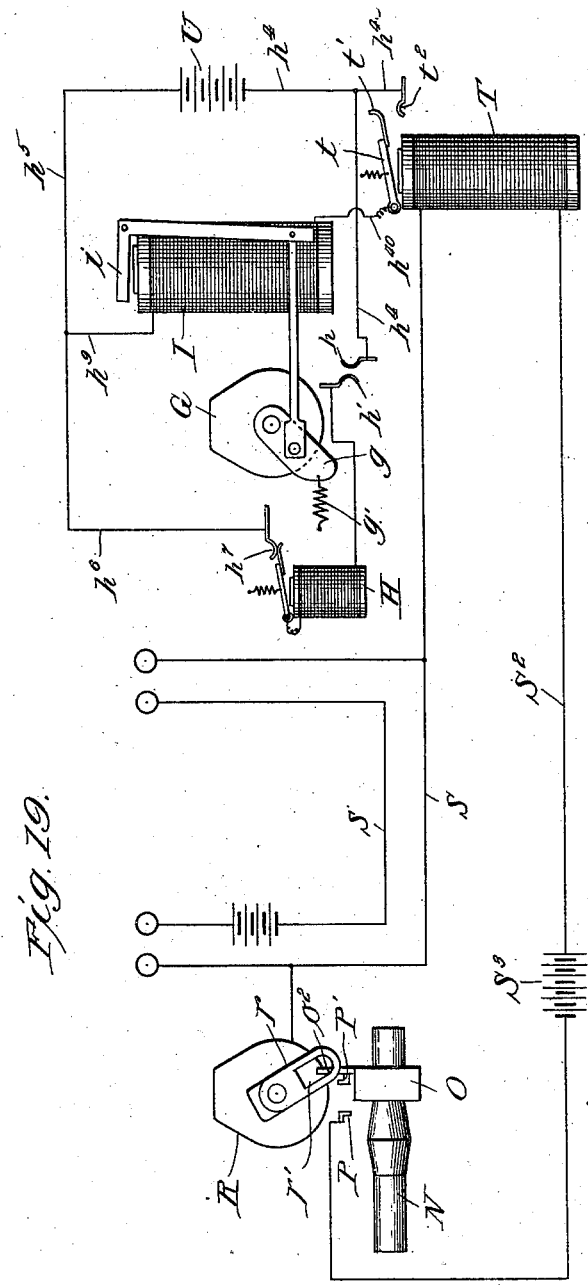
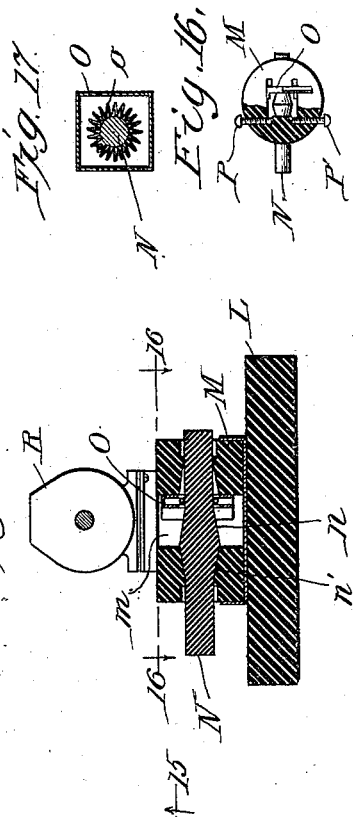
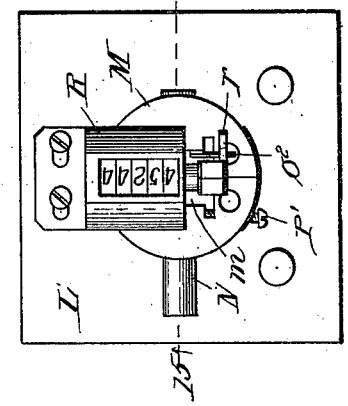
Witnesses:
Harry S. Gaither
Inventor:
Emanuel L. Buxbaum
by Chamberlin & Freudenreich
attys

UNITED STATES PATENT OFFICE.

EMANUEL L. BUXBAUM, OF CHICAGO, ILLINOIS.

SYSTEM FOR REGISTERING CALLS AND LOCKING TELEPHONES.

989,762.   Specification of Letters Patent.   Patented Apr. 18, 1911.

Application filed December 2, 1909. Serial No. 530,936.

*To all whom it may concern:*

Be it known that I, EMANUEL L. BUXBAUM, a citizen of the United States, residing at Chicago, county of Cook, State of Illinois, have invented a certain new and useful Improvement in Systems for Registering Calls and Locking Telephones, and declare the following to be a full, clear, and exact description of the same, such as will enable others skilled in the art to which it pertains to make and use the same, reference being had to the accompanying drawings, which form a part of this specification.

My invention has for one of its objects to provide a reliable system for accurately registering outgoing calls of telephone users so as to guard against errors in the charges to subscribers.

A further object of my invention is to provide a simple and reliable system which may be used in sub-stations, such as private exchanges, or other places where a number of telephones are under the control of a central operator, which will make it possible accurately to apportion the total charges among a number of different subscribers.

A further object of my invention is to provide a novel locking arrangement for individual telephones so that they cannot be used except by a person having a proper key.

A further object of my invention is to provide a simple combined register and signal which is adapted to be associated with a locking device for a telephone, so arranged that a signal will be made to apprise those in the vicinity of the telephone whether or not the telephone user registered when making a call.

Figure 10:
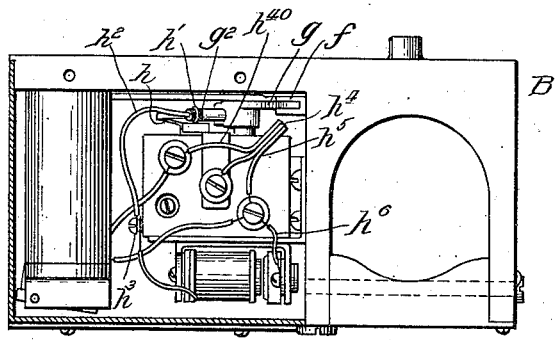
Figure 11:
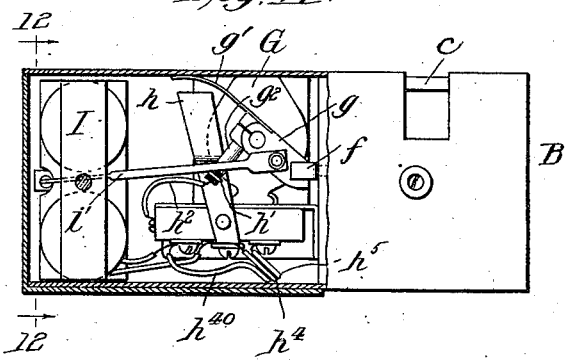
Figure 12:
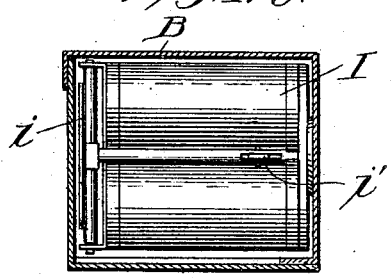
Figure 13:
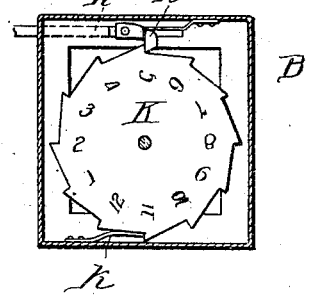

The various features of novelty whereby my invention is characterized will hereinafter be pointed out with particularity in the claims; but, for a full understanding of my invention in its various aspects, reference may be had to the following detailed description taken in connection with the accompanying drawings, wherein:

Figure 1 is a side elevation of a portion of a telephone, showing the local locking and registering device; Fig. 2 is a plan view of the parts shown in Fig. 1; Fig. 3 is a view looking in the opposite direction to that in Fig. 1, Fig. 3 being on a somewhat smaller scale than Fig. 1; Fig. 4 is a plan view of the parts mounted on the telephone, the upper wall of the casing having been removed; Fig. 5 is a section taken on line 5—5 of Fig. 4, certain of the parts being omitted in order more clearly to show parts which would otherwise be hidden; Fig. 6 is a section on line 6—6 of Fig. 4; Fig. 7 is a plan view, parts being broken away so as to show the locking bar in section; Fig. 8 is a sectional view on an enlarged scale, showing the locking bar, the unlocking key and the rod for actuating the register manually; Fig. 9 is a view looking toward the left in Fig. 1, the front wall of the casing being omitted; Fig. 10 is a section on line 10—10 of Fig. 5; Fig. 11 is a section on line 11—11 of Fig. 4; Fig. 12 is a section on line 12—12 of Fig. 11; Fig. 13 is a view showing the underside of an auxiliary register; Fig. 14 is a plan view of the instrument at the central station; Fig. 15 is a section on line 15—15 of Fig. 14; Fig. 16 is a section on line 16—16 of Fig. 15; Fig. 17 is a section through the movable contact member and actuating the plunger of the instrument at the central station; Fig. 18 is a fragmentary detailed view of the register at the central station; Fig. 19 is a diagram showing the registers at central station and at the subscriber's station, a buzzer, and the electromagnetic controlling and actuating means; and Fig. 20 is a diagram showing the use of a light instead of a buzzer.

In accordance with my invention I make use of two registers, one of which is located at a central station and the other adjacent to the subscriber's telephone, together with means whereby the actuation of one of the registers effects a similar actuation of the other. Where one of the registers is located at the central station of the telephone company, the controlling system is preferably electromagnetic, one of the telephone wires being used as part of the controlling system and there being a return circuit of some sort which will not interfere with the proper use of the telephone circuit as such. I also provide a signal which is operated whenever one of the registers is actuated so as to register a call, thereby informing both the operator and the subscriber that a registration has been made.

The subscriber's register is preferably associated with a locking device for the telephone so that upon unlocking the telephone, the user may cause a registration to be made. This latter feature makes it possible to use the subscriber's portion of the apparatus independently of central so that this portion of the apparatus may be installed for the convenience of individual users who desire to keep an accurate record of the calls which they have made.

It will be seen that if there are a number of telephones connected to a single line and each being equipped with this apparatus, the total number of calls of the telephone service may be apportioned among the several telephones in accordance with the number of calls which have emanated from each telephone. By associating a signal with the register, those in the vicinity of any telephone will be informed whether or not a user registered properly when making a call and provision is therefore made against fraudulent or accidental failure to register.

Where the system is installed in connection with a private exchange, it may be that it is desired to use a telephone at times when the person in charge of the switchboard is absent. In order that a record may be kept of such calls without producing disagreement between the number of calls indicated on the main registers, I have provided an auxiliary register which may be actuated independently of the main register of the telephone so that the sum of the calls on the main registers and those on the auxiliary registers will give the total which is chargeable to the line.

I prefer to provide each instrument with a key which differs from the keys of other instruments so that only a person having the proper key can use any particular telephone.

Referring to the first thirteen figures of the drawings, A represents the stem of an ordinary desk telephone and B a casing which is secured thereto directly beneath the hook $a$. For the sake of brevity I shall confine the detailed description to this particular form of casing, although it will be evident that my invention is applicable to telephones of any other type. The casing is provided with a slot $b$ into which the hook is adapted to project and mounted in the casing is a locking bar C having a lug $c$ which is adapted to overlie the hook when the hook is down and lock the telephone against use until the locking bar is retracted. The locking bar is most clearly shown in Figs. 4, 6, and 7. $c^1$ is a rod projecting rearwardly from the locking bar and surrounded by a spring $c^2$ which tends to hold the locking bar in its normal locking position. The locking bar has an extension $C^1$ which normally bears against the front wall $b^1$ of the housing or casing and limits the forward movement of the locking bar. The front end of the extension is provided with an elongated opening $c^3$ which registers with an opening $b^2$ in the front wall of the casing. A transverse slot $c^4$ is cut through the upper face of the extension $C^1$ and communicates with the opening $c^3$. D is a key of such diameter that it will pass through the opening $b^2$ and enter the openings $c^3$ in the locking bar. This key is provided with a laterally projecting finger $d$ which will permit the key to be inserted only when the finger is held in such a position that it can pass through a branch slot $c^5$ extending at right angles to the slot $c^4$ and also communicating with the opening or passage $c^3$. In order to unlock the telephone the key is inserted and then turned slightly when the finger reaches the slot $c^4$. Now, upon pressing the key inwardly, the finger engages with the rear wall of the slot $c^4$ and the locking bar can be pushed backward. The finger is made long enough so that when it projects horizontally and points into the casing instead of outwardly, it projects beyond the side of the locking bar and through a slot $e$ in a stationary tube E which lies outside and parallel with the locking bar. In this tube is slidably mounted a rod F which extends rearwardly through the tube and is provided at its rear end with a jaw $f$ for a purpose to be hereinafter described.

It will be seen that the locking bar may be pushed back by means of the key regardless of whether the key is turned toward the right or toward the left. If it is turned toward the left then the finger will point in the opposite direction from that shown in Fig. 8 and the rod F will not be affected. However, if the key is placed in the position shown in Fig. 8, a rearward movement of the key and locking bar will produce a similar movement in the rod F. It is necessary to turn the key either toward the right or toward the left for, if allowed to remain vertical, it will not be able to pass a stop $b^3$ which is arranged within the casing.

In the rear portion of the casing or housing is mounted a register G of any suitable type having an arm $g$ which normally lies within the jaw $f$ of the rod F. $g^1$ is a spring adapted to return the arm $g$ into the one extreme position after it has been carried into the other extreme position. It will now be seen that by inserting the key and turning it in the proper direction, an unlocking of the telephone causes the register to be actuated through the backward movement of the rod F. When the locking bar is released it is carried forward by this spring and at the same time associated with the register moves the arm of the register back to its normal position, the arm carrying with it the rod F.

In order that a signal may be given when the register is actuated, I have arranged within the casing an electro-magnetic buzzer H. The circuit for the buzzer is actuated so that the buzzer will continue to sound until the telephone is again locked. Instead of this audible signal any other suitable indicating device may, of course, be employed. In the arrangement shown $h$ is a stationary resilient contact piece, and $h^1$ is a movable contact piece carried upon an insulated projection $g^2$ mounted on the arm $g$. The parts are so proportioned that in a normal position, as indicated in Fig. 11, the contact pieces $h$ and $h^1$ are out of engagement with each other; when, however, the register arm is oscillated in the manner previously described the movable contact piece $h^1$ engages with the stationary contact piece and closes a circuit for the indicator. This circuit is most clearly shown in Figs. 4, 10, and 11; $h^2$ being a conductor extending from the contact piece $h^1$ to one terminal $h^3$, of the buzzer. The contact piece $h$ is connected with a line conductor $h^4$ and the second terminal is connected to line conductor $h^5$ through a conductor $h^6$. Between the two terminals of the buzzer there is arranged a vibrating switch $h^7$ of the usual construction. It will be seen that when the circuit is closed between contacts $h$ and $h^1$ and current is flowing through conductors $h^4$ and $h^5$, an energizing circuit will be completed through the buzzer and this circuit will be alternately made and broken at the vibrating switch so as to produce a buzzing sound. By this arrangement there will be a continuous signal or indication during the time the telephone is unlocked. The features of my invention heretofore described may be used independently of or in connection with those to be described hereinafter, depending upon whether or not the register is applied to a single telephone independently of other telephones or of central.

In order that a subscriber's register may be operated from a central station, I have provided in the housing in rear of the register an electro-magnet I whose armature $i$ is connected to the arm $g$ of the register by means of a rod $i^1$. The parts are so proportioned that when the magnet is energized it will actuate the register independently of the locking means and at the same time will cause the signal to be given. As indicated in Fig. 10, the magnet may be supplied with current from the line conductor $h^5$ and an additional line conductor $h^{40}$.

For the purpose of permitting a record to be made whenever the telephone is unlocked in any way I have arranged on top of the main casing an auxiliary casing $B^1$ which contains a numbered ratchet wheel K, one of the numbers at a time being visible through an opening $b^4$ in the upper wall of the auxiliary casing. This feature is most clearly illustrated in Figs. 6 and 13.

$k$ is a pawl for holding the ratchet wheel in any position into which it has been moved and $k^1$ is an actuating pawl. The actuating pawl may be connected to the locking bar by means of a rod $k^2$ which projects upwardly through the top of the main casing and into the auxiliary casing. Whenever the locking bar is retracted it actuates the ratchet wheel so that if it is desired to use the telephone at any time, the number of calls may be recorded by the auxiliary device.

In Figs. 14 to 17 I have illustrated the apparatus at the central station, although, it will, of course, be understood that the structural details may be widely varied. L is a supporting base on which is mounted an insulating block M. This block is provided with a central opening $m$. N is a plunger which extends transversely through the block and is provided with a double cam surface $n$ and $n^1$ so arranged that one cam surface or the other will always project into the opening $m$ in the block. O is a metallic frame mounted in the opening $m$ and surrounding the plunger. Within this frame is a spiral spring $o$ which is bent about the plunger in the form of a ring. When the parts are in the position indicated in Fig. 15, the spring lies about a reduced portion of the plunger. Upon pushing the plunger toward the right the spring is expanded by the cam face $n$ so that when the highest point of this cam face is reached the spring is under considerable tension. As soon as the high point of the cam $n$ has been past the spring begins to contract and snaps the frame toward the left where the spring can again come adjacent to a reduced portion of the plunger. The frame O is provided with an upwardly-projecting arm $o^1$ which has a laterally-projecting finger $o^2$. P and $P^1$ are a pair of stationary contacts which are adapted to be bridged by the arm O when it is moved to the left. Mounted upon the block M is a register R similar to the register G. The arm $r$ of this register is provided with a slot $r^1$ in which the finger $o^2$ projects. Consequently when the plunger N is moved in one direction or the other it swings the arm of the register in the opposite direction. It will be seen that as long as the arm of the register is in one position, the plunger will be occupying a position wherein it closes a circuit, while in the other position of the arm of the register the circuit is broken. Consequently, by providing the proper connections, the central office may complete a circuit through the subscriber's station when moving the register in one direction, and interrupting the circuit upon returning the register to its normal position. It is therefore impossible to move the register back and forth so as to move the registering mechanism forward one step without also closing the circuit.

In Fig. 19, I have shown the various connections diagrammatically. S and $S^1$ represent the usual telephone wires between the central office and the subscriber's station. $S^2$ is an additional wire in which is placed a battery $S^3$. The wire S is connected to one terminal of an electro-magnet T placed at the subscriber's station and the other terminal of this electro-magnet is connected to the wire $S^2$. The contacts P and $P^1$ are connected respectively to the wire $S^2$ and the wire S. The armature $t$ of the electro-magnet carries a movable contact $t^1$ which is adapted to coöperate with a stationary contact $t^2$ when the electro-magnet is energized and thereby completing an independent circuit containing a battery U. From one terminal of the battery leads the conductor $h^5$ which is connected to the buzzer by means of conductor $h^6$ and to one terminal of the magnet I from conductor $h^9$. From the other terminal of the battery leads the conductor $h^4$ which is connected to the stationary contact $h$. Conductor $h^4$ is also connected to the second terminal of the electro-magnet I through a wire $h^{40}$ which contains the switch members $t^1$ and $t^2$.

Assuming the parts to be in the position shown in the diagram and that the subscriber has called up the central office, the operator at central pushes the plunger N toward the right until the arm O snaps to the left, closing the circuit at P and $P^1$ and swinging the arm of the register into a position which will permit a registration to be effected upon the return of the arm to its normal position. As soon as the circuit is closed at P and $P^1$ current will flow from the battery $S^3$ through the electro-magnet T through wire S and back to the battery, energizing the magnet T and bringing contact $t^1$ into engagement with contact $t^2$. As soon as this occurs the circuit for the electro-magnet I is completed, current flowing through this electro-magnet from battery U. Upon the energization of the electro-magnet I the arm $g$ of the register G is drawn toward the right, closing the signal circuit at contacts $h$ and $h^1$. Current now flows from battery U through the buzzer and the buzzer continues to signal until the circuit is again broken at the contacts $h$ and $h^1$. As soon as the subscriber has been connected to the party whom he has called, the central operator again pushes the plunger N so as to return the parts at the central station to the position indicated in the diagram, breaking the circuit at contacts P and $P^1$. This completes the registration at the central station and at the same time deënergizes magnet T so that the circuit for the magnet I is interrupted. As soon as this occurs, the spring $g^1$ returns the arm $g$ of the register G to the position indicated, completing the registration at the subscriber's station. At the same time the circuit is broken at contacts $h$ and $h^1$ so that the signaling ceases. The parts remain in this position while the subscriber is talking and until he again calls up the central office for a new connection, whereupon the operation of signaling and registering is repeated.

It will be seen that I have provided a simple and positive arrangement for recording the number of calls and one which may be associated with an ordinary telephone system without requiring more than a single additional wire and without interfering in any way with the proper operation of the telephone system. Where the operator's set is used in a private exchange the wire S may be replaced by another wire so that the signaling and registering system is entirely independent of the telephone system and yet an accurate record will be kept of all of the outgoing calls and of the calls from each individual telephone.

As I have previously described the apparatus it will be seen that the buzzer or other signal or indicator continues to give a signal or indication from the time the plunger at the central station is moved toward the right (as viewed in Fig. 19) until it is again moved toward the left. These two movements of the plunger are necessary to effect a registration and therefore advantage may be taken of the fact that the signal or indicator is active until the plunger is returned to its normal position for the purpose of notifying the subscriber of the time for which he will be charged while making a long distance call or another call for which a toll is made depending upon the time of service. To accomplish this the central operator does not return the plunger to its normal position so as to complete the registration until the conversation has ended and therefore the duration of the conversation is shown by the continuance of the signal or indication.

In Fig. 20 I have illustrated a visible signal or indicator instead of an audible one, the signal or indicator taking the form of an incandescent lamp $H^0$ which occupies the same position in the system as the buzzer H. The visible signal is not open to the objection which may be made to the audible in that it cannot interfere with the conversation.

While I have described in detail only a single preferred form of my invention, I do not desire to be limited to this specific form, but intend to cover all constructions and arrangements, whether used for telephone work or not, which fall within the terms employed in the definitions of my invention constituting the appended claims.

Claims:

1. In combination with a telephone system, a registering instrument at a subscriber's station, a registering instrument at the central station, electromagnetic actuating means for one of said registering instruments, means for actuating the other registering instrument, and a controlling device for said electro-magnetic actuating means associated with the latter instrument.

2. In combination with a telephone system, a registering instrument at a central station, a registering instrument at a subscriber's station, and actuating means controllable from the central station for causing said instruments to be actuated simultaneously, said actuating means including means for preventing the instrument at the central station from being actuated independently of the instrument at the subscriber's station.

3. In combination with a telephone system, a registering instrument at a central station, a registering instrument at a subscriber's station, means for simultaneously actuating said instruments from the central station, and means for locally actuating the instrument at the subscriber's station.

4. In combination with a telephone system, a registering instrument at a central station, a registering instrument at a subscriber's station, means for simultaneously actuating both of said instruments from one of said stations, a signal associated with one of said instruments, and means for actuating the latter instrument locally.

5. In combination, a telephone, a lock for the telephone hook, a register a signal associated with said register a second register remote from the other register, means for simultaneously actuating said registers, and a device for releasing said lock, said device having two operative lock-releasing positions and means associated with said device for actuating the local register when said device is in one of said positions.

6. In combination, a telephone, a lock for the telephone hook, a register, actuating means for the register, and a key for said lock having two positions in one of which it releases the lock without effecting said actuating means and in the other of which it releases the lock and causes said actuating means to operate the register.

7. In combination, a telephone, a lock for the telephone hook, a register, actuating means for the register, and a key for said lock having two positions in one of which it releases the lock without effecting said actuating means and in the other of which it releases the lock and causes said actuating means to operate the register, an auxiliary register, and connections between said lock and said auxiliary register to cause the latter to be actuated upon movement of the lock.

8. In combination with a telephone system, a registering instrument, a device at the central station for actuating said instrument, said device having two positions and being so constructed and arranged that it must be moved from one position into the other and back again in order to make a complete record, a signal or indicator at the subscriber's station, and means controlled by said device for causing said signal to remain active while said device remains in its second position.

9. In combination with a telephone system, a register, a signal or indicator at the subscriber's station, and means at the central station for actuating said register and causing said signal or indicator to indicate the length of the conversation.

In testimony whereof, I sign this specification in the presence of two witnesses.

EMANUEL L. BUXBAUM.

Witnesses:
WM. F. FREUDENREICH,
BRISEN SWEET.

---

Copies of this patent may be obtained for five cents each, by addressing the "Commissioner of Patents, Washington, D. C."